Feb. 4, 1947.         G. E. UNDY         2,415,396
TIMING CONTROL SYSTEM
Filed April 7, 1943
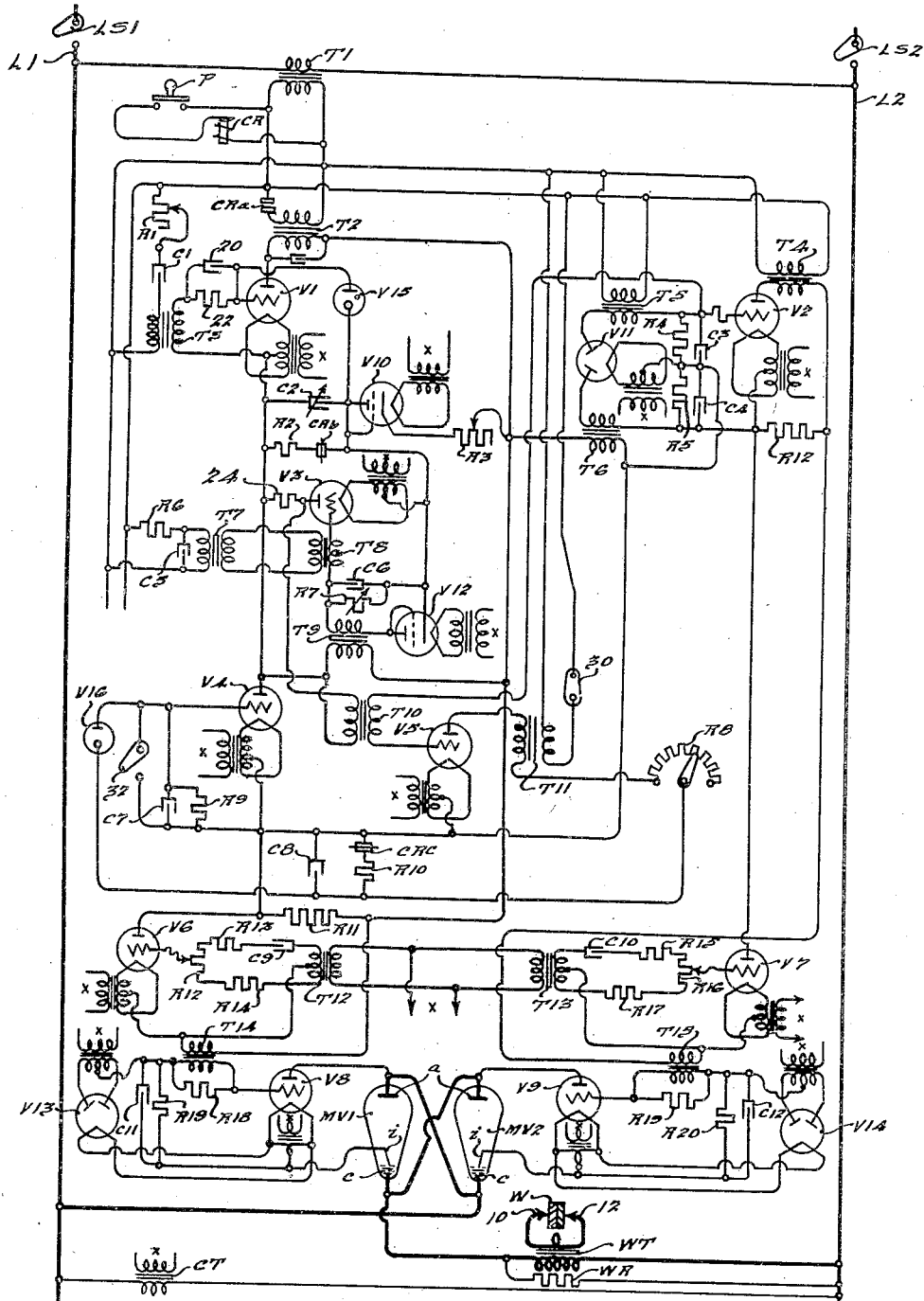
INVENTOR
Gustav E. Undy.
BY
Harness, Dickey & Pierce.
ATTORNEYS Patented Feb. 4, 1947

2,415,396

UNITED STATES PATENT OFFICE 2,415,396

TIMING CONTROL SYSTEM

Gustav E. Undy, Detroit, Mich., assignor, by mesne assignments, to Weltronic Company, Southfield Township, Oakland County, Mich., a corporation of Michigan Application April 7, 1943, Serial No. 482,113

16 Claims. (Cl. 250—27)

The present invention relates to electrical control systems and in particular is directed to the provision of an improved system for controlling welding apparatus.

The principal objects of the present invention are to provide a system of the above generally indicated type which is simple in arrangement and is reliable and efficient in operation; to provide such an arrangement which may be characterized as embodying means to cause current to flow between an alternating current supply circuit and a load circuit, particularly a welding circuit, in a succession of pulses, each pulse comprising a precisely predeterminable fraction of each of a correspondingly precisely predeterminable number of half cycles of the source; to provide such an arrangement wherein the intervals between successive pulses are correspondingly and precisely controlled; to provide such an arrangement wherein the number of pulses in a particular succession may be accurately and variably controlled.

With the above as well as other and more detailed objects in view, which appear in the following description and in the appended claims, a preferred but illustrative embodiment of the invention is shown in the accompanying drawing in which the sole figure is a diagrammatic representation of a welding control system embodying the invention.

It will be appreciated from a complete understanding of the present invention that the improvements thereof may be embodied in control systems intended for many different purposes. It is now preferred to utilize the invention in connection with resistance welding control apparatus, and in an illustrative but not in a limiting sense the invention is so disclosed herein.

In certain of its aspects, the present invention is directed to improvements upon or modifications of the inventions described and claimed in Collom Patents Nos. 2,289,321 and 2,295,635, granted, respectively, July 7, 1942 and September 15, 1942, and Undy application, Serial No. 402,922, filed July 18, 1941.

Referring to the drawing, the illustrative electrodes 10 and 12 of a spot welding machine are shown as connected to the secondary winding of a usual welding transformer WT. The primary winding of the welding transformer is provided with a usual shunt resistor WR, and is connected across the source of supply represented by the line conductors L1 and L2, in series relation with a pair of reversely connected electric valves MV1 and MV2. Valves MV1 and MV2 may be variously constructed, but are preferably of the type sold commercially under the trade name "Ignitrons." As will be understood, these valves have rectifying properties, and, while being normally non-conductive may be rendered conductive during half cycles of the source in which the anodes $a$ thereof are positive. When so rendered conductive, they remain so for the balance of the corresponding half cycles of current flow. The ignition or firing of these valves is accomplished by applying an igniting potential between the igniters $i$ and the cathodes $c$ thereof.

The just-mentioned igniting potentials for the main rectifiers MV1 and MV2 are applied thereto through a pair of associated firing valves V8 and V9, the principal electrodes whereof are coupled between the anodes and igniters of the corresponding named rectifiers, all in a known manner. The valves V8 and V9 are normally non-conductive, and are supplied with negative bias voltages through corresponding full wave rectifiers V13 and V14. In order to render valves V8 and V9 conductive so as to fire the corresponding main rectifiers, transformers T14 and T15 are associated with the grid circuits in such relation that when energized they overcome the just mentioned biases.

As previously mentioned, the system provides for the delivery to the welding transformer of successions of pulses of current, each comprising predetermined fractions or portions of a predetermined number of half cycles of the source. In the present instance, the point in each such half cycle at which the firing of the main rectifiers occurs is controlled by a pair of so-called "heat-control" valves V6 and V7, the grids whereof are supplied with igniting potentials through corresponding transformers T12 and T13 and associated phase shift circuits comprising condensers C9 and C10, and resistors R12 through R17. These phase shift circuits will be recognized as being similar to those described in detail in the aforesaid Undy application, Serial No. 402,922.

In the illustrated arrangement, each pulse of welding current is made up of equal numbers of positive and negative half cycles of the source, which feature is provided by a pair of timing valves V1 and V2. The timing valve V1 also serves to initiate each succession of impulses, under the influence of a selectively operable starting switch, illustrated as being a push button P. The push button P serves to apply anode voltage to the valve V1 so as to enable it to initially pass current at a point in a positive half cycle which is determined by a transformer T3 preferably of the peaking type. The transformer T3 is associated with the grid circuit of valve V1 and is provided with adjustable phase shift elements comprising the resistor R1 and condenser C1, which, as will be understood, may be set to cause valve V1 to become conductive at a precisely predeterminable point in successive positive half cycles of the source. The anode circuits of valves V1 and V6 are connected in series relation with each other and also include the previously mentioned firing transformer T14.

The other timing valve V2 is arranged as hereinafter described to pass current in each negative half cycle which succeeds a positive half cycle in which valve V1 has passed current. The anode circuit of valve V2 is connected in series with valve V7 and transformer T15.

In accordance with the arrangement of said Collom Patent No. 2,295,635, valve V1 is provided with an integrating circuit comprising condenser C2, which becomes effective at the conclusion of the predetermined number of positive half cycles to be included in each pulse, to interrupt further conduction through valve V1. This action, as described below, terminates the corresponding pulse of current to the welding circuit.

In the present instance, valve V3 and its associated timing elements comprising condenser C5 function to unlock valve V1 at the conclusion of each interval between successive pulses, whereby to again render valve V1 conductive and initiate the next succeeding pulse.

In the present arrangement, further integrating means, comprising the counting valve V5 and the associated period controlling valve V4, are provided to variably determine the overall number of pulses to be included in a particular succession of pulses. The anode circuit of valve V4 is connected in series with the anode circuits of valves V1 and V6. So long, therefore, as valve V4 is conductive, the main rectifier MV1 may be fired under the control of valves V1 and V6. When, however, as described below, the desired number of pulses has been delivered to the welding circuit, valve V4 is blocked, interrupting the further firing of the main rectifier MV1. The trailing timing valve V2 is subject to control by the period valve V4 and consequently when valve V4 is blocked, further firing of the trailing valve V2, and consequently further firing of the companion main rectifier MV2, is also interrupted.

Preferably, the above mentioned valves V1, V2, V3, V4, V5, V6, and V7 are of the usual three element gas-filled discontinuous control type, which, as will be understood, are normally non-conductive, but may be rendered conductive by applying igniting potentials to the grids thereof during half cycles of the source in which the anodes thereof are positive. When so rendered conductive, they remain so for the corresponding half cycle of current flow.

In addition to the above mentioned valves, the present system utilizes a series of usual rectifiers V10, V11, and V12 and a pair of usual gas filled discharge devices V15 and V16.

It is believed that the remaining details of the system may best be understood from the description of the operation thereof. Assuming it is desired to condition the welding system for operation, the illustrative line switches LS1 and LS2 may be closed, which action energizes the line conductors L1 and L2 from a conventional alternating current source. Closure of the just-mentioned switches completes obvious energizing circuits for the primary windings of transformers T1 and CT. The secondary terminals of transformer CT bear the reference character $x$, and it will be understood that upon being energized this transformer applies energizing current to the filament transformers associated with valves V1 through V14, thereby preparing these valves for operation. It will be understood that, if desired, usual interlocking means may be provided to delay the actual initiation of the welding operation for a period sufficient to allow the filaments of these valves to reach emissive temperatures. Such means is not shown in the drawing, in order to simplify the same. The energization of transformer CT also applies energizing current to the phase shift transformers T12 and T13 associated with the heat control valves V6 and V7. It will be noted that these transformers are provided with center tapped secondary windings, the center taps being directly connected to the cathodes of valves V6 and V7, respectively. The end terminals of the secondary windings of transformers T12 and T13 are coupled to the grids of valves V6 and V7, respectively, through bridge circuits. The bridge circuit associated with valve V6 includes in series the condenser C9 and resistors R12, R13 and R14. The bridge circuit for valve V7 includes condenser C10 and resistors R15, R16 and R17. The connection between the grid of valve V6 and resistor R12 is adjustable, and it will be appreciated that this connection may be made so as to cause the phase of the voltage between the grid and the cathode of valve V6 to bear any desired relation to the voltage of the welding circuit. Similar comments apply to the phase relation between the grid-cathode voltage of valve V7 and the voltage of the welding circuit.

Under the conditions stated, valves V6 and V7 are not supplied with anode voltage and, consequently, the energization of transformers T12 and T13 serves no purpose other than to supply the grid circuits of these valves with energy.

The energization of transformer T1 supplies, through obvious circuits, energy to transformers T3, T4, T5, T7 and T11. The energization of transformer T3 applies peaked potentials to the grid of valve V1 during successive half cycles. For purposes of the following description, it will be assumed that the anode of valve V1 is rendered positive during positive half cycles. The peaked potential thus applied to the grid of valve V1 during negative half cycles does not tend to render this valve conductive, but the peaked potentials applied during positive half cycles do have this tendency.

Under the conditions stated, however, valve V1 is not supplied with anode potential and, consequently, the energization of transformer T3 serves only to condition the system for operation. As aforesaid, it will be appreciated that the points in successive half cycles at which the peaked potentials are applied are determined by the adjustment of resistor R1 relative to condenser C1.

In usual practice, these phase shift elements are adjusted to cause the peaked potentials to be applied at approximately the power factor angle of the welding load circuit.

The energization of transformer T5 enables this transformer to pass current through one of the paths afforded by the full wave rectifier V11 and charge up condenser C3, which action applies a negative or blocking bias to the grid of valve V2. In view of this negative bias, the energization of transformer T4 is without effect. It will be noted that transformers T2 and T4 are oppositely connected to the source and, consequently, transformer T4 brings the anode of valve V2 to a positive value during successive negative half cycles of the source.

The energization of transformer T7 serves to energize transformer T8 which is associated with the grid circuit of valve V3. It is to be noted that transformers T3 and T8 are oppositely connected to the source and, consequently, transformer T8 tends to render valve V3 conductive during negative half cycles. The energization of transformer T8 serves only to prepare the system for operation.

The energization of transformer T11 applies anode potential to the counting valve V5, which action is without further effect since this valve is normally rendered non-conductive by the negative bias voltage of condenser C3.

Assuming it is desired to initiate a welding operation, and assuming further that the work has been properly positioned between the electrodes 10 and 12, the switch P may be closed. It will be understood that any usual means may be provided to cause the proper clamping of the work between the electrodes, and that any suitable manual or automatic means may be provided to effect the closure of switch P. Closure of switch P completes an obvious energizing circuit for the usual electromagnetically operable control relay CR, in response to which action, this relay assumes the energized position, closing its contact CRa and opening its contacts CRb and CRc. The opening of the latter contacts interrupts the normally complete discharge circuits for condensers C2 and C8, respectively, which discharge circuits serve, during idle periods, to ensure the full discharge of condensers C2 and C8.

Closure of contact CRa completes an obvious energizing circuit for the primary winding of transformer T2, thereby enabling this transformer to apply anode potential to valve V1. It will be appreciated that closure of control relay CR may occur at random relative to the periodicity of the source. If such closure occurs during a negative half cycle, or at a point in a positive half cycle which is later than the peaking point of transformer T3, such action is without effect until the peaking point in the next positive half cycle is reached. When such point is reached, valve V1 becomes conductive and enables transformer T2 to pass current through the series circuit which includes valve V1, the now conductive valve V4, and resistor R11, which resistor is connected in parallel with firing transformer T14 and valve V6. The just mentioned series circuit passes sufficient current to maintain valve V1 in a conductive condition until valve V6 is rendered conductive under the influence of the associated phase shift transformer T12. When such phase shift point is reached in the positive half cycle now in progress, transformer T12 brings the grid of valve V6 to a conductive valve, enabling this valve to pass current and energize transformer T14.

Upon being energized, transformer T14 applies a potential across resistor R18 which overcomes the negative bias normally applied to the grid of valve V8 through rectifier V13 and renders this valve conductive. Upon being rendered conductive, valve V8 applies an igniting potential between the cathode c and the igniter i of the associated main rectifier MV1. In response to this igniting impulse, main rectifier MV1 becomes conductive and initiates a flow of current to the welding transformer WT.

Upon being rendered conductive, valve V1 also enables transformer T2 to pass current through a series circuit which includes valve V1 and valve V4 and the primary winding of transformer T6, thereby energizing transformer T6. Upon being energized, transformer T6 is enabled to pass current through the other path afforded by the full wave rectifier V11, and supply charging current to condenser C4. Condensers C3 and C4 are connected in opposition to each other and the potential to which condenser C4 is charged is superior to that of condenser C3. During the positive half cycle in question, accordingly, condenser C4 becomes effective to render the grid of valve V2 positive relative to the cathode thereof. During the positive half cycle in progress, however, such action is without effect since the anode of valve V2 is negative.

At the conclusion of the positive half cycle of control voltage, transformer T4 brings the anode of valve V2 to a positive value. At this time condenser C4 is still sufficiently charged to maintain the grid of valve V2 at a conductive value. At the beginning of the negative half cycle immediately following the positive half cycle in which valve V1 initiated the welding operation, accordingly, valve V2 is rendered conductive. This action enables transformer T4 to pass current through valve V2 and resistor R12. As in the case of resistor R11, resistor R12 is proportioned to pass sufficient current to maintain valve V2 in a conductive condition until valve V7 is rendered conductive. Valve V7 is rendered conductive, as will be understood, at that point in the negative half cycle for which the phase shift elements associated with transformer T13 are adjusted. When this phase shift point is reached, transformer T13 brings the grid of valve V7 to a conductive value, thereby enabling transformer T4 to pass current through the series circuit which includes valves V2, V7 and transformer T15. Upon being energized, transformer T15 applies a potential across resistor R19 which overcomes the negative bias normally applied to the grid of valve V9 through rectifier V14. This action renders valve V9 conductive and enables it to apply an igniting potential between the cathode c and igniter i of the other main rectifier MV2. The application of this igniting potential renders rectifier MV2 conductive and initiates the first negative half cycle of current flow to the welding circuit.

As thus far described, accordingly, the main rectifier MV1 has passed a portion of a positive half cycle of current to the welding circuit and the main rectifier MV2 has passed a corresponding portion of the next successive negative half cycle of current to the welding circuit, the portions of said half cycles being determined by the adjustment of the potentiometer circuits associated with the phase shift transformers T12 and T13 and the heat control valves V6 and V7.

At a time in the next positive half cycle of the source which, as before, preferably corresponds to approximately the power factor angle of the load circuit, transformer T3 again applies a peaked impulse to the grid of valve V1 and again renders it conductive. This action again enables transformer T2 to pass an impulse of current through the series circuit including valve V1 and the now conductive valve V4 and resistor R11. At the firing point in such positive half cycle determined by the adjustment of the heat control circuits associated with the grid of valve V6, also, this valve V6 is again rendered conductive, enabling current from transformer T2 to pass therethrough and energize transformer T14 again. As before, this action again fires the main rectifier MV1. A portion of the impulse of current delivered by transformer T2 also energizes transformer T6, enabling it to recharge condenser C4 to a value high enough to overcome the negative biasing effect, on valve V2, of condenser C3. At or near the beginning of the next negative half cycle, accordingly, transformer T4 is again enabled to pass current through valve V2. This action, as soon as valve V7 is rendered conductive, enables transformer T4 to energize transformer T15, resulting in the ignition of the other main rectifier MV2. It will be appreciated from the foregoing that, subject only to the controlling effect of condenser C2 and of valves V3, V4 and V5, and the associated elements, described below, the timing valves V1 and V2 and the associated heat control valves V6 and V7 remain continuously effective to cause flow of current to the welding circuit in successive positive and negative half cycles.

Considering now the means for controlling the length of each pulse of current which is delivered to the welding circuit during the course of an over-all welding period, it will be recognized that condenser C2 is connected across transformer T2, in series with valve V1, rectifier V10 and the control resistor R3. Each impulse of current passed by valve V1, accordingly, adds an incremental charge to condenser C2. A predetermined number of these incremental charges corresponding to the number of cycles which it is desired to include in each pulse of current to the welding circuit, and which charging rate and number may be variably determined by adjusting resistor R3, brings the charge on condenser C3 to a sufficiently high value to enable it to break down the glow discharge valve V15. It will be noted that this valve is continuously connected across condenser C2, in series with the secondary winding of transformer T3 and the parallel-connected, auxiliary condenser 20 and resistor 22. When valve V15 breaks down, it serves to directly couple the negative plate of condenser C2 to the grid of valve V1. The resultant negative biasing effect on valve V1 of condenser C2 is sufficient to render succeeding peaked impulses from transformer T3 ineffective to fire valve V1. It will be appreciated that if the breakdown of valve V15 occurs in a positive half cycle but before the peaking point therein of transformer T3, such action prevents the firing of valve V1 when such peaking point is reached, and so interrupts the delivery of welding current at the conclusion of the negative half cycle of current flow which immediately preceded the positive half cycle in question. On the other hand, if the breakdown of valve V15 occurs in a positive half cycle, but at a time which is later than the peaking point therein, or if it occurs during a negative half cycle, such breakdown has no effect on the flow to the welding circuit of the positive or negative half cycle of current then in progress, but does result in terminating the flow of welding current at the end of such negative half cycle. Condenser C2 is thus effective to terminate the flow of welding current at the conclusion of a negative half cycle and thus limits the first pulse of welding current to an equal number of positive and negative half cycles.

Considering now the means for determining the length of the off period or "cool" period which intervenes between successive pulses, it will be recognized that the primary winding of transformer T9 is connected across transformer T2 in series with valve V1. Each impulse of current passed by valve V1, consequently, enables transformer T9 to apply a charging potential to condenser C6, through the continuously conductive rectifier V12. The constants of this circuit are preferably such that the initial impulse passed by transformer T9, during the first positive half cycle of welding current flow, brings condenser C6 to its fully charged value. When so fully charged, condenser C6 applies a negative bias between the grid and cathode of the associated valve V3, thereby rendering it non-conductive. At the conclusion of the first pulse of current, as determined by the breakdown of the glow discharge valve V15, described above, valve V1 becomes ineffective to transmit further impulses to transformer T9 and the energy stored in condenser C6 is, consequently, enabled to discharge through the local circuit including resistor R7, the rate of discharge being determined, of course, by the adjustment of this circuit.

The grid-cathode potential of valve V3 is the algebraic sum of the voltages of condenser C6 and transformer T8, which transformer tends to render valve V3 conductive during negative half cycles, and the voltage whereof is relatively low in comparison to the fully charged voltage of condenser C6. During each negative half cycle of its voltage, accordingly, transformer T8 tends to render valve V3 conductive and, when the discharge of condenser C6 has progressed to a predetermined degree, is enabled to do so. When valve V3 is rendered conductive, as aforesaid, condenser C2 is enabled to discharge through the local circuit which includes valve V3 and resistor 24. The constants of this circuit are preferably so chosen that the complete discharge of condenser C2 is enabled to take place during the negative half cycle in which valve V3 is rendered conductive.

At the peaking point in the next positive half cycle, accordingly, transformer T3 is again enabled to fire valve V1 and initiate the second pulse of current to the welding circuit, which pulse proceeds as described above. Such pulse is also terminated, as before, by the action of condenser C2 and the resultant cool period is also terminated, as above described, by the breakdown during a negative half cycle of valve V3. As thus far described, accordingly, the system is effective to deliver successive pulses of current to the welding circuit, which successive pulses are spaced by off or cool periods of predetermined length.

Considering now the means for determining the over-all number of pulses to be included in the over-all welding period, it will be noted that the counting valve V5 is continuously supplied with anode potential by transformer T11. As stated above, transformer T11 is out of phase with transformer T2 and, consequently, this transformer tends to render valve V5 conductive during each negative half cycle of each successive welding current pulse and each successive off or cool interval. Valve V5 is, however, normally biased to a non-conductive condition by the continuously charged condenser C3 associated with valve V2, it being noted that the grid circuit of valve V5 includes this condenser in series relation with the control transformer T10.

The primary winding of transformer T10 is directly connected across the previously mentioned resistor 24 associated with the anode circuit of valve V3 and condenser C2. During the final negative half cycle of each off or cool period (between successive pulses), when condenser C2 discharges through valve V3, it builds up a potential across resistor 24. This potential energizes transformer T10 and enables it to overcome the biasing effect on valve V5 of condenser C3. When valve V5 is so rendered conductive, transformer T11 is enabled to pass an impulse of current therethrough.

The counting condenser C8 is connected across transformer T11 in series with valve V5 and the adjusting potentiometer R8. Each such impulse of current through valve V5 thus adds an incremental charge to condenser C8 and, at the expiration of a predetermined number of welding pulses and cool periods, this charge reaches a value sufficient to break down the glow discharge valve V16, which valve is connected across condenser C8 in series with the parallel-connected resistor R9, condenser C7 and the grid cathode circuit of valve V4. When this action occurs, condenser C8 is enabled to apply a blocking negative bias to the grid of valve V4. Since the successive increments of charging current are supplied to condenser C8 during negative half cycles, it will be appreciated that the break-down of valve V16 and the consequent biasing off of valve V4 occur during a negative half cycle, which half cycle is also the final half cycle of the last cool period in the over-all welding period.

During the positive half cycle which immediately follows the negative half cycle in which the blocking of valve V4 occurs, and which would normally be the initial half cycle of the next succeeding pulse of current to the welding circuit, transformer T3 is again enabled to fire valve V1, tending to initiate another pulse of welding current. In this case, however, by virtue of the blocked condition of valve V4, transformer T2 is unable to deliver current to resistor R11 or to valve V6. Valve V4 thus serves to render the conductive condition of valve V1 ineffective to initiate another pulse. It will be recalled that the charging up of condenser C4 associated with the grid circuit of the trailing valve V2 is controlled by valve V4, since the primary circuit for transformer T6, through which condenser C4 derives charging current, includes the anode circuit of valve V4. The blocked condition of valve V4, therefore, not only renders valve V1 ineffective to cause the main rectifier MV1 to be rendered conductive, but also renders the conductive condition of this valve ineffective to condition the trailing valve V2 for operation.

Considering now the resetting of the system, in readiness for the next over-all welding period, it will be appreciated that any suitable manual or automatic means may be provided to restore switch P to the open position. For example, in the operation of seam welding apparatus for which the present system is well adapted, cam operated means responsive to the traverse of the work relative to the welding electrodes may be utilized. The opening of switch P de-energizes control relay CR, which thereupon resumes the normal position, reopening contact CRa and reclosing contacts CRb and CRc. The reopening of contact CRa de-energizes transformer T2, consequently preventing further operation of the system, as will be obvious. The reclosure of contact CRc completes a discharge circuit for condenser C8, which includes resistor R10, thereby restoring condenser C8 to a fully discharged condition. Closure of contact CRb completes a discharge circuit for condenser C2, which includes resistor R2, thereby insuring the fully discharged condition of condenser C2. Condenser C6, which determines the length of the cool interval, is provided with a continuously complete discharge circuit and reaches a substantially fully discharged condition in terminating the final cool interval, as aforesaid. Also, condenser C6 is immediately fully recharged at the beginning of the first pulse of welding current in an over-all welding period. For these reasons, although suitable means may be provided, if desired, to insure the full discharge of condenser C6 upon release of relay CR, such means are usually not necessary.

It will be appreciated from the foregoing that the number of half cycles to be included in each pulse is widely variable by suitably adjusting resistor R3 to control the charging rate of condenser C2. Similar comments apply to the adjustment of the cool interval, which may be varied by adjusting resistor R7 associated with condenser C6. In connection with very short impulses, of the order, for example, of one full cycle of the source, it is to be noted that while condenser C4, which is charged during the positive half cycle of such a pulse, remains sufficiently charged at the beginning of the succeeding negative impulse to render valve V2 conductive, the charge on condenser C4 leaks off at a sufficiently fast rate so that this condenser is ineffective to render valve V2 conductive except during the negative half cycle which immediately follows a positive half cycle in which valves V1 and V4 have passed current.

It will be appreciated, further, that the number of pulses making up an over-all welding period may also be varied between relatively wide limits by suitably adjusting the potentiometer resistor R8, which correspondingly controls the charging rate of the counting condenser C8.

Summarizing, further, it will be recognized that the heat control circuits associated with valves V6 and V7 are adjustable over a relatively wide range, so as to vary the fraction of half cycles which are passed to the welding circuit from full heat to a relatively minor fraction of full heat. It will be recalled that resistors R11 and R12 sustain current flow through valves V1 and V4 and through valve V2, respectively, during the portions of corresponding positive and negative half cycles which intervene between the instants at which valves V1 and V2 and valves V6 and V7, respectively, are rendered conductive.

In certain instances, it is desirable to eliminate the automatic control of the over-all number of impulses to be included in each welding period. As illustrated, this may be accomplished by opening switch 30, associated with the primary winding of transformer T11, which action prevents the charging up of the counting condenser C8 and, consequently, leaves valve V4 in a continuously conductive condition. It will be noted that condenser C7 and resistor R9, associated with the grid circuit of valve V4, are normally utilized to tie the grid of this valve to the cathode thereof during the interval prior to the breakdown of the glow discharge valve V16. It will be understood that during the course of welding periods greater in length than would desirably be afforded by the integrating circuits comprising valve V5 and condenser C8, condenser C7 could be expected to build up a charge which might become high enough to block valve V4. To obviate such possibility, it is preferred to provide an additional switch 32, which may be and preferably is mechanically interlocked with switch 30 so that when switch 30 occupies the open position, switch 32 occupies the closed position and vice versa. Switch 32, when closed, directly ties the grid of valve V4 to the cathode thereof, and, as will be understood, serves to maintain this valve in a continuously conductive condition.

It is noted that in the present system the potentiometers associated with the heat control resistors R12 and R16 are shown as independently and manually controlled. It will be understood that, if desired, these potentiometer taps may be tied together for simultaneous operation and that in further accordance with the disclosure of the above identified Undy application, means may be provided to cause an automatic or progressive adjustment of the heat setting during the course of each welding impulse.

Although only a single specific embodiment of the invention has been described in detail, it will be appreciated that various modifications in the form, number and arrangement of the parts may be made without departing from the spirit and scope of the invention.

What is claimed is:

1. In a system for controlling the flow of current between a load circuit and a source of pulsating current, a main electric valve interposed between said source and said circuit and operable to pass successive pulsations of said source, and a control network for controlling said valve so as to enable it to pass current during a first predetermined number of successive pulsations and to restrain flow of current during a succeeding second predetermined number of successive pulsations, said network including a control valve, control means actuable to alter the conductive condition of said control valve during each of said first number of pulsations, means rendering said main valve operably responsive to each such alteration, timing means operable as a consequence of the altered conductive condition of said control valve for preventing said alteration during each of said second number of pulsations, and additional timing means for rendering said first timing means ineffective at the end of said second number of pulsations.

2. In a system for controlling the flow of current between a load circuit and a source of pulsating current, a main electric valve interposed between said source and said circuit and operable to pass successive pulsations of said source, and a control network for controlling said valve so as to enable it to pass current during a first predetermined number of successive pulsations and to restrain flow of current during a succeeding second predetermined number of successive pulsations, said network including a control valve, control means actuable to alter the conductive condition of said control valve during each of said first number of pulsations, means rendering said main valve operably responsive to each such alteration, timing means operable as a consequence of the altered conductive condition of said control valve for preventing said alteration during each of said second number of pulsations, and additional timing means for rendering said first timing means ineffective at the end of said second number of pulsations, said first timing means including an energy storage device disposed to receive an incremental charge during each said pulsation of said first predetermined number.

3. In a system for controlling the flow of current between a load circuit and a source of pulsating current, a main electric valve interposed between said source and said circuit and operable to pass successive pulsations of said source, and a control network for controlling said valve so as to enable it to pass current during a first predetermined number of successive pulsations and to restrain flow of current during a succeeding second predetermined number of successive pulsations, said network including a control valve, control means actuable to render said control valve conductive during each of said first number of pulsations, means causing said main valve to pass current in each pulsation in which said control valve passes current, timing means operable as a consequence of the passage of current by said control valve for preventing conduction through said control valve during each of said second number of pulsations, and additional timing means for rendering said first timing means ineffective at the end of said second number of pulsations.

4. In a system for controlling the flow of current between a load circuit and a source of pulsating current, a main electric valve interposed between said source and said circuit and operable to pass successive pulsations of said source, and a control network for controlling said valve so as to enable it to pass current during a first predetermined number of successive pulsations and to restrain flow of current during a succeeding second predetermined number of successive pulsations, said network including a control valve, control means actuable to render said control valve conductive during each of said first number of pulsations, means causing said main valve to pass current in each pulsation in which said control valve passes current, timing means operable as a consequence of the passage of current by said control valve for preventing conduction through said control valve during each of said second number of pulsations, and additional timing means for rendering said first timing means ineffective at the end of said second number of pulsations, said first timing means including an energy storage device disposed to receive an incremental charge during each said pulsation of said first predetermined number.

5. In a system for controlling the flow of current between a load circuit and a source of pulsating current, a main electric valve interposed between said source and said circuit and operable to pass successive pulsations of said source, and a control network for controlling said valve so as to enable it to pass current during a first predetermined number of successive pulsations and to restrain flow of current during a succeeding second predetermined number of successive pulsations, said network including a control valve, control means actuable to render said control valve conductive during each of said first number of pulsations, means causing said main valve to pass current in each pulsation in which said control valve passes current, timing means operable as a consequence of the passage of current by said control valve for preventing conduction through said control valve during each of said second number of pulsations, and additional timing means for rendering said first timing means ineffective at the end of said second number of pulsations, said first timing means including an energy storage device disposed to receive a portion of the current which passes through said control valve during the said pulsations of said first predetermined number.

6. In a system for controlling the flow of current between a load circuit and a source of pulsating current, a main electric valve interposed between said source and said circuit and operable to pass successive pulsations of said source, and a control network for controlling said valve so as to enable it to pass current during a first predetermined number of successive pulsations and to restrain flow of current during a succeeding second predetermined number of successive pulsations, said network including a control valve, control means actuable to alter the conductive condition of said control valve during each of said first number of pulsations, means rendering said main valve operably responsive to such condition, timing means operable as a consequence of the altered conductive condition of said control valve for preventing said alteration during each of said second number of pulsations, additional timing means for rendering said first timing means ineffective at the end of said second number of pulsations, said first timing means including an energy storage device disposed to receive an incremental charge during each said pulsation of said first predetermined number, and said additional timing means including energy storage means disposed to be charged as a consequence of the operation of said control means, the discharge period of said storage means determining the number of said second pulsations.

7. In a system for controlling the flow of current between a load circuit and a source of pulsating current, a main electric valve interposed between said source and said circuit and operable to pass successive pulsations of said source, and a control network for controlling said valve so as to enable it to pass current during a first predetermined number of successive pulsations and to restrain flow of current during a succeeding second predetermined number of successive pulsations, said network including a first control valve, control means actuable to render said first control valve conductive during each of said first number of pulsations, means causing said main valve to pass current in each pulsation in which said first control valve passes current, timing means operable as a consequence of the actuation of said control means for preventing conduction through said first control valve during each of said second number of pulsations, additional timing means for rendering said first timing means ineffective at the end of said second number of pulsations, said first timing means including an energy storage device disposed to receive an incremental charge during each said pulsation of said first predetermined number, said additional timing means comprising an energy storage device disposed to be charged by a flow of current through said first control valve, and means coupling said last-mentioned storage device to said first timing means so that the discharge period thereof determines the number of said second pulsations.

8. In a control system for controlling the flow of current between a load circuit and a source of pulsating current, the combination of a main electric valve interposed between said source and said circuit and disposed to pass successive pulsations of said source, and a control network for controlling the passage of current through said main valve, said network comprising a pair of electric control valves each having anode-cathode circuits, said anode-cathode circuits being connected in series relation with each other and being supplied with pulsating current, means rendering one of said control valves normally non-conductive and the other normally conductive, timing means for rendering said one control valve conductive during selected said pulsations, and additional timing means rendering the other control valve non-conductive after said first control valve has passed current during a predetermined number of said pulsations.

9. In a control system for controlling the flow of current between a load circuit and a source of pulsating current, the combination of a main electric valve interposed between said source and said circuit and disposed to pass successive pulsations of said source, and a control network for controlling the passage of current through said main valve, said network comprising a pair of electric control valves each having anode-cathode circuits, said anode-cathode circuits being connected in series relation with each other and being supplied with pulsating current, means rendering one of said control valves normally non-conductive and the other normally conductive, timing means for rendering said one control valve conductive during selected said pulsations, and additional timing means rendering the other control valve non-conductive after said first control valve has passed current during a predetermined number of said pulsations, said additional timing means including energy storage means disposed to be charged as a consequence of the flow of current through said one control valve.

10. In a control system for controlling the flow of current between a load circuit and a source of pulsating current, the combination of a main electric valve interposed between said source and said circuit and disposed to pass successive pulsations of said source, and a control network for controlling the passage of current through said main valve, said network comprising a pair of electric control valves each having anode-cathode circuits, said anode-cathode circuits being connected in series relation with each other and being supplied with pulsating current, means rendering one of said control valves normally non-conductive and the other normally conductive, timing means for rendering said one control valve conductive during selected said pulsations, and additional timing means rendering the other control valve non-conductive after said first control valve has passed current during a predetermined number of said pulsations, said timing means including means for causing said one control valve to pass current during successive on periods and to restrain such passage during intervening off periods, each said period including at least one said pulsation.

11. In a control system for controlling the flow of current between a load circuit and a source of pulsating current, the combination of a main electric valve interposed between said source and said circuit and disposed to pass successive pulsations of said source, and a control network for controlling the passage of current through said main valve, said network comprising a pair of electric control valves each having anode-cathode circuits, said anode-cathode circuits being connected in series relation with each other and being supplied with pulsating current, means rendering one of said control valves normally non-conductive and the other normally conductive, timing means for rendering said one control valve conductive during selected said pulsations, additional timing means rendering the other control valve non-conductive after said first control valve has passed current during a predetermined number of said pulsations, said timing means including means for causing said one control valve to pass current during successive on periods and to restrain such passage during intervening off periods, each said period including at least one said pulsation, and said additional timing means including means disposed to receive an incremental charge during each said off period.

12. In a control system for controlling the flow of current between a load circuit and a source of alternating current, the combination of a pair of rectifiers interposed between said source and said load circuit and disposed to pass half cycles of respectively opposite polarity of said source, a synchronizing network for said rectifiers comprising first and second control valves, said network further comprising control means for transmitting an impulse of current from said source through one of said control valves during successive half cycles of one polarity, means rendering the corresponding rectifier operably responsive to each said impulse, means energized by each said impulse and being operably independent of the action of said corresponding rectifier for conditioning said second control valve to pass current whereby to enable said source to transmit an impulse through said second control valve during each half cycle of opposite polarity which succeeds a half cycle of said one polarity in which a said first-mentioned impulse was transmitted, means rendering the other said rectifier operably responsive to each said impulse transmitted during a half cycle of said opposite polarity, a first timing means for rendering said control means ineffective after said first control valve has passed a predetermined number of said impulses, and additional timing means for rendering said first timing means ineffective.

13. In a control system for controlling the flow of current between a load circuit and a source of alternating current, the combination of a pair of rectifiers interposed between said source and said load circuit and disposed to pass half cycles of respectively opposite polarity of said source, a synchronizing network for said rectifiers comprising first and second control valves, said network further comprising control means for transmitting an impulse of current from said source through one of said control valves during successive half cycles of one polarity, means rendering the corresponding rectifier operably responsive to each said impulse, means energized by each said impulse and being operably independent of the action of said corresponding rectifier for conditioning said second control valve to pass current whereby to enable said source to transmit an impulse through said second control valve during each half cycle of opposite polarity which succeeds a half cycle of said one polarity in which a said first-mentioned impulse was transmitted, means rendering the other said rectifier operably responsive to each said impulse transmitted during a half cycle of said opposite polarity, a first timing means energized by flow of current through said first control valve for rendering said control means ineffective, and additional timing means energized as a consequence of the flow of current through said first control valve for again rendering said control means effective.

14. In a timing system having a source of alternating current, the combination of a first valve having principal electrodes connected to said source and having a control electrode, a second valve having a control electrode and having principal electrodes electrically coupled to said first control electrode and one of said first principal electrodes and effective when rendered conductive to apply a starting potential between said first control electrode and said one principal electrode and thereby render said first valve conductive, means for successively applying a potential in predetermined time phase relation to said source to said second control electrode to successively render the second valve conductive, means including an energy storage device charged by flow of current between said principal electrodes of said second valve, means coupling said last mentioned means to said second control electrode so as to apply the charged potential of said device to said second control electrode, and timing means for completing a discharge circuit for said device.

15. In a timing system having a source of alternating current, the combination of a first valve having principal electrodes connected to said source and having a control electrode, a second valve having a control electrode and having principal electrodes electrically coupled to said first control electrode and one of said first principal electrodes and effective when rendered conductive to apply a starting potential between said first control electrode and said one principal electrode and thereby render said first valve conductive, means for successively applying a potential in predetermined time phase relation to said source to said second control electrode to successively render the second valve conductive, means including an energy storage device charged by flow of current between said principal electrodes of said second valve, means coupling said last mentioned means to said second control electrode so as to apply the charged potential of said device to said second control electrode, said charged potential rendering said second valve non-conductive, and timing means operable as a consequence of said application for completing a discharge circuit for said device whereby to again render said second valve conductive.

16. In a timing system having a source of alternating current, the combination of a first valve having principal electrodes connected to said source and having a control electrode, a second valve having a control electrode and having principal electrodes electrically coupled to said first control electrode and one of said first principal electrodes and effective when rendered conductive to apply a starting potential between said first control electrode and said one principal electrode and thereby render said first valve conductive, means for successively applying a potential in predetermined time phase relation to said source to said second control electrode to successively render the second valve conductive, means including an energy storage device charged by flow of current between said principal electrodes of said second valve, means coupling said last mentioned means to said second control electrode so as to apply the charged potential of said device to said second control electrode, said charged potential rendering said second valve non-conductive, and timing means comprising an energy storage device which is charged by flow of current through said second valve and which is enabled to discharge when said second valve is rendered non-conductive, for completing a discharge circuit for said first device, whereby to again render said second valve conductive.

GUSTAV E. UNDY.

REFERENCES CITED

The following references are of record in the file of this patent:

UNITED STATES PATENTS

| Number | Name | Date |
|---|---|---|
| 2,303,453 | Gulliksen | Dec. 1, 1943 |
| 2,232,541 | Levoy, Jr. | Feb. 18, 1941 |
| 2,340,077 | Pearson et al. | Jan. 25, 1944 |
| 2,046,712 | Washburn | July 7, 1936 |
| 2,081,987 | Dawson | June 1, 1937 |